US008769705B2

(12) United States Patent
Zhang et al.

(10) Patent No.: US 8,769,705 B2
(45) Date of Patent: Jul. 1, 2014

(54) METHOD FOR FLEXIBLE DATA PROTECTION WITH DYNAMICALLY AUTHORIZED DATA RECEIVERS IN A CONTENT NETWORK OR IN CLOUD STORAGE AND CONTENT DELIVERY SERVICES

(75) Inventors: Xinwen Zhang, San Jose, CA (US); Huijun Xiong, Blacksburg, VA (US); Guoqiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/371,944

(22) Filed: Feb. 13, 2012

(65) Prior Publication Data

US 2012/0317655 A1    Dec. 13, 2012

Related U.S. Application Data

(60) Provisional application No. 61/495,866, filed on Jun. 10, 2011.

(51) Int. Cl.
*G06F 21/00* (2013.01)

(52) U.S. Cl.
USPC ............... 726/28; 726/27; 713/165; 713/167; 713/170; 713/193

(58) Field of Classification Search
USPC ............................................ 726/28; 713/193
See application file for complete search history.

(56) References Cited

U.S. PATENT DOCUMENTS

| | | | |
|---|---|---|---|
| 5,506,904 A | 4/1996 | Sheldrick et al. | |
| 6,850,252 B1 | 2/2005 | Hoffberg | |
| 7,181,017 B1 | 2/2007 | Nagel et al. | |
| 7,974,714 B2 | 7/2011 | Hoffberg | |
| 8,024,808 B1 | 9/2011 | Gleichauf | |
| 8,468,345 B2 * | 6/2013 | Auradkar et al. | ............. 713/167 |
| 2002/0112240 A1 | 8/2002 | Bacso et al. | |

(Continued)

FOREIGN PATENT DOCUMENTS

| | | |
|---|---|---|
| CN | 101411107 A | 4/2009 |
| CN | 101523365 A | 9/2009 |
| CN | 101647006 A | 2/2010 |

OTHER PUBLICATIONS

"Cloud Computing: Distributed Internet Computing for IT and scientific research"; Dikaiakos et al; IEEE Computer Society; 4 pages; Sep./Oct. 2009.*

(Continued)

*Primary Examiner* — Jason Lee
(74) *Attorney, Agent, or Firm* — Conley Rose, P.C.; Grant Rodolph; Brandt D. Howell

(57) ABSTRACT

A networking system comprising an application service that runs on a cloud infrastructure and is configured to receive dual encrypted content from a content provider and re-encrypt the dual encrypted content to enable dynamic user group control for group-based user authorization, and a cloud storage service coupled to the application service and configured to store the dual encrypted content from the content provider and the re-encrypted dual encrypted content from the application service, wherein the application service and the storage service are configured to communicate and operate with a content delivery service that uses a content delivery network (CDN) to deliver the re-encrypted content to one or more users in a group authorized by the content provider.

15 Claims, 5 Drawing Sheets

(56) References Cited

U.S. PATENT DOCUMENTS

| | | |
|---|---|---|
| 2002/0124182 A1 | 9/2002 | Bacso et al. |
| 2004/0213273 A1 | 10/2004 | Ma |
| 2005/0086465 A1 | 4/2005 | Sapkota et al. |
| 2005/0216745 A1 | 9/2005 | Speare et al. |
| 2006/0167784 A1 | 7/2006 | Hoffberg |
| 2006/0236369 A1 | 10/2006 | Covington et al. |
| 2007/0087756 A1 | 4/2007 | Hoffberg |
| 2007/0100913 A1 | 5/2007 | Sumner et al. |
| 2007/0101436 A1* | 5/2007 | Redlich et al. .................. 726/27 |
| 2008/0080718 A1 | 4/2008 | Meijer et al. |
| 2008/0082448 A1 | 4/2008 | Meijer et al. |
| 2008/0215509 A1 | 9/2008 | Charlton |
| 2009/0019509 A1 | 1/2009 | Horn et al. |
| 2009/0080649 A1 | 3/2009 | Dellow |
| 2009/0177793 A1 | 7/2009 | Josa et al. |
| 2009/0190754 A1 | 7/2009 | Moskowitz et al. |
| 2009/0287837 A1 | 11/2009 | Felsher |
| 2010/0138865 A1* | 6/2010 | Rai et al. .......................... 725/44 |
| 2010/0235285 A1 | 9/2010 | Hoffberg |
| 2010/0317420 A1 | 12/2010 | Hoffberg |
| 2011/0131411 A1 | 6/2011 | Lin et al. |
| 2011/0173089 A1 | 7/2011 | Tan |

OTHER PUBLICATIONS

Foreign Communication From a Related Counterpart Application, PCT Application No. PCT/CN2012/076691, International Search Report, Sep. 20, 2012, 3 pages.

Foreign Communication From a Related Counterpart Application, PCT Application No. PCT/CN2012/076691, Written Opinion, Sep. 20, 2012, 8 pages.

* cited by examiner

METHOD FOR FLEXIBLE DATA PROTECTION WITH DYNAMICALLY AUTHORIZED DATA RECEIVERS IN A CONTENT NETWORK OR IN CLOUD STORAGE AND CONTENT DELIVERY SERVICES

CROSS-REFERENCE TO RELATED APPLICATIONS

The present application claims the benefit of U.S. Provisional Patent Application No. 61/495,866 filed Jun. 10, 2011 by Xinwen Zhang et al. and entitled "Method for Flexible Data Protection with Dynamically Authorized Data Receivers in a Content Network or in Cloud Storage and Content Delivery Services," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Information Centric Network (ICN) is a type of network architecture in which the focus is on locating and providing information to users rather than on connecting end hosts that exchange data. One type of ICN is a Content Oriented Network (CON). In a CON, also referred to as a Content Centric Network (CCN), a content router is responsible for routing user requests and content to proper recipients. In the CON, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

SUMMARY

In an embodiment, the disclosure includes a networking system comprising an application service that runs on a cloud infrastructure and is configured to receive dual encrypted content from a content provider and re-encrypt the dual encrypted content to enable dynamic user group control for group-based user authorization, and a cloud storage service coupled to the application service and configured to store the dual encrypted content from the content provider and the re-encrypted dual encrypted content from the application service, wherein the application service and the storage service are configured to communicate and operate with a content delivery service that uses a content delivery network (CDN) to deliver the re-encrypted content to one or more users in a group authorized by the content provider.

In another embodiment, the disclosure includes an apparatus for a public cloud comprising one or more network components operating at a public cloud and comprising one or more network interfaces configured to receive a content that is dual encrypted from a publisher and stored at a storage component at the public cloud and configured to receive a request for the content from a subscriber, and a processor configured to re-encrypt a portion of the stored content before allowing the subscriber access to the content in response to the request via a CDN.

In another embodiment, the disclosure includes a secure content publishing method implemented by a content provider coupled to a cloud service, comprising encrypting with a processor a content object using a data encryption key, encrypting with a processor the encrypted content object using a secret key to obtain a dual encrypted content object, publishing the dual encrypted content object to the cloud service, and distributing via a content delivery network (CDN) a group decryption key for decrypting the published content object to a plurality of users in a group.

In yet another embodiment, the disclosure includes a secure content retrieving method implemented by a cloud service, comprising receiving a dual encrypted content object form a publisher, storing the dual encrypted content object at the cloud service, receiving a request to access the stored content object from a subscriber in a group of users, receiving a re-encryption key from the publisher, re-encrypting with a processor a portion of the stored content object, storing the re-encrypted portion at the cloud service, and delivering the stored content object including the re-encrypted portion to the subscriber via a CDN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
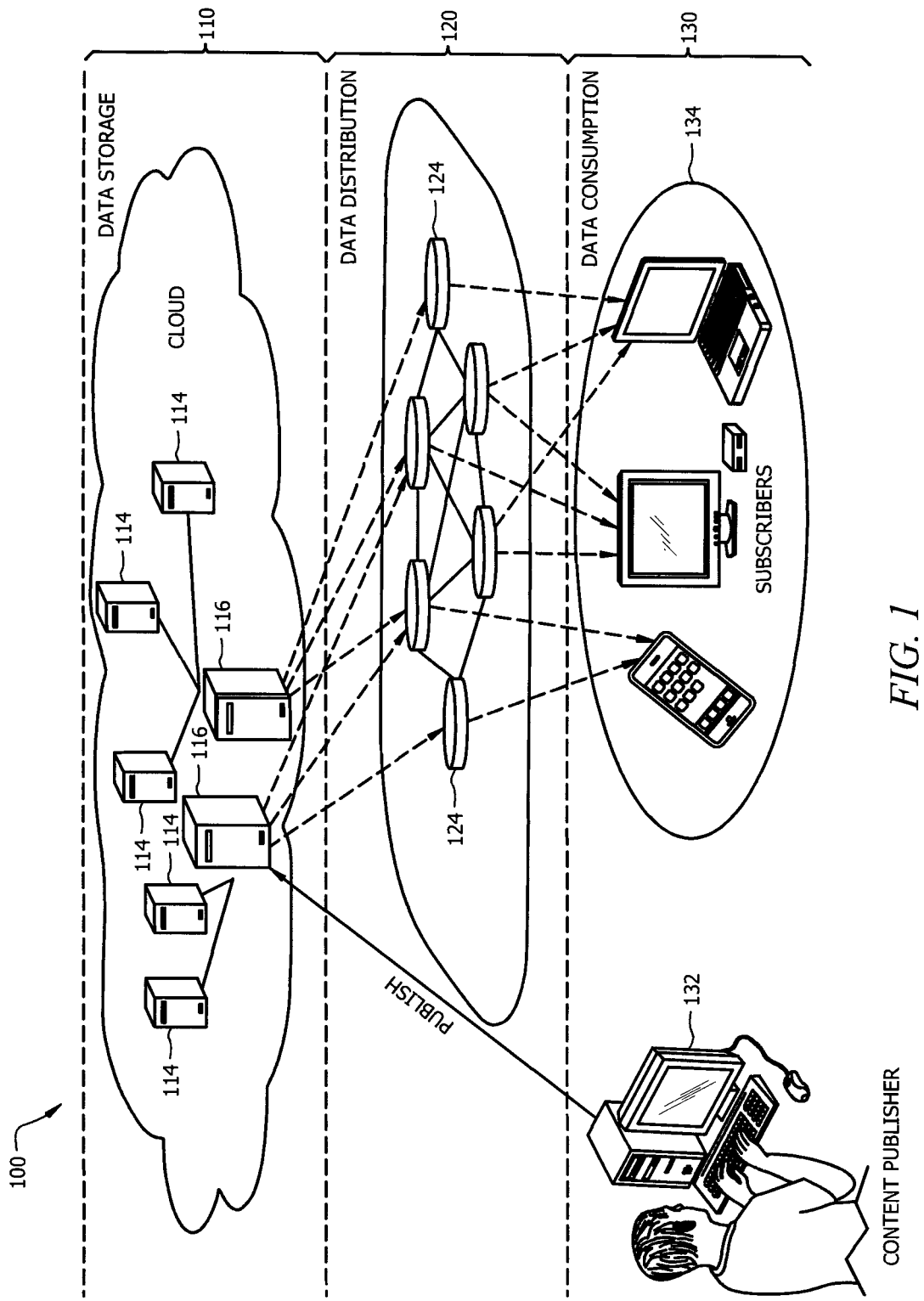
FIG. 1 is a schematic diagram of an embodiment of a cloud-based storage and delivery service system.

It should be understood at the outset that although an illustrative implementation of one or more embodiments are provided below, the disclosed systems and/or methods may be implemented using any number, of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Recent advancements in Internet and information technology have revealed two significant trends. First, media content may represent a significant portion of Internet traffic. For example, video streaming is expected to consume approximately 90 percent of Internet traffic in the near future. Utilizing cloud computing and storage resources may also be a significant trend for enterprises and consumer-oriented commercial services. Cloud computing is the delivery of computing as a service rather than a product, whereby shared resources, software, and information may be provided to computers and other devices as a service over a network, typically a public network such as the Internet. Substantially large scale content processing, storage, and distribution via public cloud infrastructures may be promising for quality-guaranteed and cost-efficient media streaming services.

Despite the increasing usage of cloud in applications and services, security issues have been among a concern for cloud computing. For example, how to maintain the confidentiality and privacy of outsourced content in the public cloud remains a challenging task. The security requirements may become more complex with flexible content processing and sharing among a large number of users through cloud-based applications and services. The requirements may include realizing content security by the content provider that uses public cloud services, e.g., instead of the cloud service provider. As such, the content provider may need to encrypt associated content with keys that are out of the reach of the cloud provider. Further, access control policies may need to be flexible and distinguishable among users with different privileges to access the content, e.g., where each piece of content may be shared by different users or groups, and users may belong to multiple groups. The requirements may also include minimizing or reducing the number of redundant copies of the content cached in the content delivery network, e.g., a CON, to preserve efficiency of content distribution via the network. Thus, a user may earn benefits from the cache of encrypted content of other users who have the same privilege.

A cloud-based content storage and delivery service, e.g., where content storage, processing, and distribution are based on cloud computing, may use a CON or another CDN infrastructure to deliver services. The services may include media and other content, such as video streaming over the Internet. The CDN may be any network that provides a content caching feature. The CON infrastructure may be one type of CDN that provides the content caching feature, e.g., where at least some content routers may be used to cache content in the nearest edge locations of the network to users. However, the CON may also route content or data based on name prefixes (e.g., instead of network addresses), while other more general CDNs may comprise other types of (traditional) routers, which may route data based on network addresses instead of prefixes. Both the CON and the other CDNs may serve as a delivery service for delivering or distributing content from the cloud to the users.

Disclosed herein is a system and method for providing a cloud-based storage and delivery service that may use a CON or other CDN infrastructure for content storage and dissemination (or distribution). The system and method may provide end-to-end (publisher-to-subscriber) content confidentiality protection by securely sharing and distributing content data via data storage and content delivery services in the cloud and CON (or CDN). Secured content storage may be achieved by encrypting the content before publishing, e.g., in a public network or storage places. The system may use dual encryption algorithms to encrypt content before publishing the content to the cloud. A proxy re-encryption algorithm may also be used to transfer published encrypted content, which may then be decrypted with updated secret keys. The encrypted content is also referred to herein as cipher content or ciphertext. To achieve flexible access control policies, broadcast revocation mechanisms may be implemented to renew shared secrets (keys) for decrypting and hence accessing encrypted content, e.g., when a user (or subscriber) joins or leaves a content sharing group.

The security objectives of the content or data protection system above may include ensuring content confidentiality in the cloud storage and content delivery network, e.g., even under the collusion between the cloud provider and the revoked subscribers. The system may also support dynamic group-based user authorization. For instance, a user may choose to join or leave a group or to be revoked from a group by the content provider at any time. Only authorized users may be able to obtain the non-encrypted or decrypted content, also referred to herein as cleartext, which may be stored in the cloud or cached in the delivery network (the CON or CDN) at any system state. The system may also support flexible security policies including forward and backward security. For forward security, a user or subscriber may not access content that is published before the user joins a group. For backward security, a user may not access content that is published after the user leaves or is revoked from a group. For forward and backward security, the system may be configured to support either or both. For example, a user may be allowed to access any movie that has been released before the user subscribes, but may not access any content after being revoked. In another example, a family content sharing application may allow a family friend to only access shared photos that are published during a determined period.

Beyond these security objectives, the content or data protection system may achieve a plurality of system and network performance requirements, including maintaining the efficiency of content delivery network, where storing a single copy of encrypted content at each system state may be desirable for the network. The system may also support light-weight end storage cost, where a relatively small amount of storage may be needed at the content provider side and the subscriber side to maintain user and key management for the data protection system. The system may not substantially affect user experiences at device side, and the overhead of security mechanisms may be acceptable.

FIG. 1 illustrates an embodiment of a cloud-based storage and delivery service system 100. The cloud-based storage and delivery service system 100 may use cloud and CON (or CDN) infrastructures for content storage and dissemination. For instance, content storage and dissemination may be based on public network or cloud infrastructures, which may support or provide relatively large scale content processing, storage, and distribution for dynamically authorized data receivers (e.g., content routers). The cloud-based storage and delivery service system 100 may have a three-layer architecture that comprises a content/data storage layer or plane 110, a content/data distribution layer or plane 120, and a content/data consumption layer or plane 130. The content/data storage layer or plane 110 may be a centralized content storage service that is provided by a cloud service provider. The content/data distribution layer or plane 120 may be a content delivery network (or service) that provides content distribution over a public network. The content/data consumption layer or plane 130 may comprise end users with various devices that act as content consumers (or subscribers).

The content/data storage layer or plane 110 may be implemented using a cloud infrastructure or service and may comprise a plurality of storage services 114 and a plurality of cloud-based application services 116. The storage services 114 may comprise any network components or devices (e.g., computers, storage devices, and/or memory devices) configured for storing data in a network or data center. The cloud-based application service 116 may be an application service that runs on a cloud infrastructure, e.g., a cloud infrastructure-as-a-service (IaaS). The cloud-based application services 116 may comprise any network components or devices (e.g., computers, servers, and/or processors) configured for processing data, e.g., in the network or data center. The cloud-based storage and delivery service system 100 may also comprise or may be coupled to one or more content providers or publishers 132 that publish associated content via one or more interfaces provided by the cloud-based application services 116. The publishers 132 may publish content data using any suitable device, computer, or network component, such as servers, personal computers (PCs), and/or similar devices.

The cloud-based application services 116 may be configured to receive the content from the publishers 132 and store the content in the storage services 114. The cloud-based application services 116 may also process the content stored in the storage services 114, e.g., via cloud storage application programming interfaces (APIs). The application services 116 may be web-like applications implemented by the content provider or publisher 132, the cloud service provider, or a third party associated with the cloud service provider that may or may not be the same party of the storage services 114. Similarly, the storage services and content delivery network or service may or may not belong to the cloud service provider. For example, Netflix may be a content provider (e.g., content publisher 132) that uses Amazon Elastic Compute Cloud (EC2) and/or Simple Storage Service (S3) for content processing and storage while leverages multiple content delivery services, such as Limelight, Level 3, and/or Akamai.

The content/data distribution layer or plane 120 may be implemented using a CON (or CDN) infrastructure and may comprise a plurality of routers 124. The routers 124 may comprise content routers configured to route content data based on name prefixes and cache at least some of the routed content. The routers 124 may also comprise other network nodes, such as other types of routers, bridges, and/or switches that may route data, e.g., based on different routing schemes. For example, the routers 124 may also comprise routers that route Internet Protocol (IP) packets and/or Ethernet packets based on network (e.g., media access control (MAC) and/or IP) addresses. The content/data consumption layer or plane 130 may comprise a plurality of users or subscribers 134 that may obtain or consume content. The subscribers 134 may subscribe content using any suitable devices, computers, or network components, such as desktop computers, laptop computers (or notebooks), mobile devices (e.g., smartphones and computer tablets), and/or similar devices.

The content data flow in the cloud-based storage and delivery service system 100 may be in the direction from the content/data storage layer or plane 110 to the content/data consumption layer or plane 130 via the content/data distribution layer or plane 120 (as shown by the arrows in FIG. 1). The content data may be published to and stored at the content/data storage layer or plane 110 (the cloud), routed through and at least partially cached at the content/data distribution layer or plane 120 (the CON or CDN), and then delivered to the content/data consumption layer or plane 130 (subscribers). To provide end-to-end network security and data confidentiality protection in storage and delivery via the cloud, the content data may also be encrypted at cloud-based storage and delivery channels (the data flow channels), where only authorized end users (subscribers 134) may decrypt and hence access the content.

A plurality of algorithms may be used (e.g., in conjunction) to achieve flexible security and efficient storage and distribution. The algorithms may be part of a data protection scheme, where initially the content provider 132 may publish encrypted content to the cloud-based storage service(s) 114 with a private secret or key of the publisher. The terms secret, key, and secret key may be used here interchangeably to refer to a secret number, word, code, or combinations thereof that may be used in the data protection scheme of the cloud-based storage and delivery service system 100. The provider 132 may also publish one or more re-encryption keys to the cloud-based service (at the content/data storage layer or plane 110), which may act as a proxy between the content provider (the publisher 132) and end users (the subscribers 134).

The re-encryption keys may be generated upon events of user joining, leaving, or actively being revoked by the content provider. When a request from a content subscriber 134 is received (at the cloud and/or the CON/CDN), the cloud-based proxy service may verify whether the content stored in the cloud storage services 114 is encrypted with the latest re-encryption key from the content publisher 132. If this condition is true, then the content may be downloaded via a content delivery service interface (the data flow channels). Otherwise, the proxy service may invalidate any encrypted form of the target data (the requested content) via the delivery service, re-encrypt the content with the latest re-encryption key from the publisher 132, and then authorize the access. As such, there may be a single cipher or encrypted copy of the content stored in cloud storage (storage services 114), and the delivery network (the CON/CDN) may serve content that is encrypted with the latest re-encryption key. Access control may be enforced by distributing a shared secret key to authorized users (subscribers 134), with which re-encrypted content may be decrypted.

The data protection scheme in the cloud-based storage and delivery service system 100 may also separate the distribution of the shared key from that of the content private publisher key and re-encryption keys. Specifically, the data protection scheme may enforce flexible authorization policies, where only authorized users (subscribers 134) may obtain the shared secret key, and the content provider may maintain substantial control over issuing new keys whenever needed. The data protection scheme may also leverage broadcast of revocation mechanisms to renew the shared secret key to achieve scalability.

The data protection scheme may be an end-to-end data protection scheme that trusts the content provider (publishers 132) and consumers (subscribers 134). For instance, a content rendering application or agent running on the subscriber's device may be trusted. The application or agent may not release the content decryption key and any decrypted content, also referred to herein as clear content, to unauthorized parties. The application or agent on the subscriber's device may remove or delete the decryption key when the subscriber leaves a group or is revoked by the content provider. The data protection scheme may also consider that the cloud service provider is honest but may be curious about the content. For example, the cloud service provider may follow and abide by the protocols and operations for storing, delivering, and/or encrypting/decrypting content, but may also actively try to obtain unauthorized clear content. The data protection scheme may account for the case where the cloud infrastructure (hardware and/or software) is exploited by attackers and/or stored content is exposed. Further, the scheme may be used where the content delivery service (e.g., the CON/CDN) is semi-trusted. For example, the content delivery service may be curious to sniff content that is distributed and/or cached in the network, but may honestly perform the protocols and operations described herein and satisfy the quality of services that may be specified in service level agreements (SLAs)

between the content provider or publisher and the delivery service provider (the CON/CDN provider).

Figure 2:
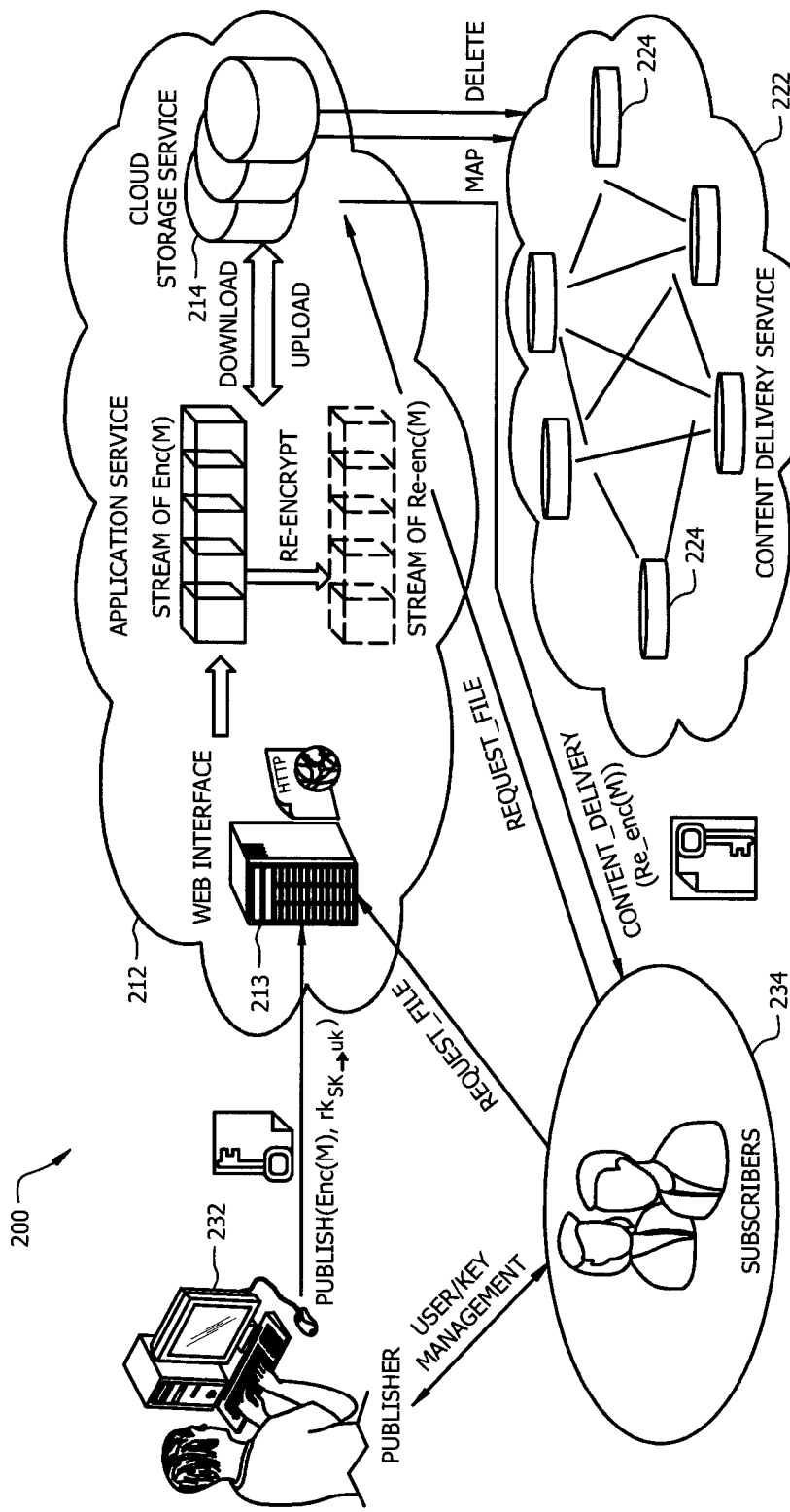
FIG. 2 is a schematic diagram of an embodiment of a data protection scheme.

FIG. 2 illustrates an embodiment of a data protection scheme 200 that may be used in the cloud-based storage and delivery service system 100, e.g., at the content/data distribution layer or plane 120. The data protection scheme 200 may comprise one or more content publishers or providers 232, one or more content subscribers or consumers 234 (e.g., in a group), a cloud 212, and a CON/CDN 222. The cloud 212 may provide an application service and a cloud storage service and may comprise a web interface 213 and one or more storage components or devices 214. The web interface 213 may communicate with the content providers 232 and the content consumers 234. The storage components 214 may store published content from the content provider 232 and provide requested content to the consumers 234. The CON/CDN 222 may comprise a plurality of routers 224 configured to route the content from the storage components 214 to the consumers 234.

The cloud may be a service provided by a cloud provider. The cloud provider may provide public cloud services, such as a storage service for content storing and a content delivery service for content distribution. The cloud provider may also provide virtual infrastructure to host application services. The application service may be used by the content provider 232 to handle, encrypt, and store content in the cloud 212 and/or by the content subscribers or consumers 234 to retrieve and decrypt the content. The content provider 232 may provide content to one or more groups of subscribers (e.g., the consumers 234) and may also provide user management of the groups. The content provider 232 may use a cloud service from the cloud provider to store and distribute content. The subscribers or consumers 234 may be able to access the content stored in the cloud 212 (via the CON/CDN 222), e.g., if the consumers 234 successfully subscribe to the content provider 232. The consumers 234 may decrypt the delivered content and hence consume or use the content, e.g., using local software.

Specifically, the application service in the cloud 212 may allow, via the web interface 213 (and/or APIs) a content provider 232 to publish and manipulate content stored in the cloud 212 and may also allow the consumers 234 to retrieve or request content. The cloud storage service may interact with the application service to store and provide the content stored in the cloud 212. The content delivery service may interact with the cloud storage service to download or forward the content from the cloud 212 to the consumers 234. In some embodiments, the content delivery service may also interact with the cloud storage service to upload or publish the content from the content provider 232 to the cloud 212.

To protect the content stored in the (public) cloud 212 from being accessed by unauthorized parties or users, the data protection scheme 200 may provide a plurality of cryptographic tools for the content provider 232 to ensure that only authorized subscribers may be able to obtain the decryption keys and hence decrypt the published or stored cipher content. Initially, the content provider 232 may pre-process cleartext (or clear content) locally by calling an encryption (Enc) function and may then publish the processed content to the (public) cloud storage service, e.g., at the storage components or devices 214. The Enc function may perform dual encryption on the content. The dual encryption may be any two-level encryption that performs a first encryption scheme on the content to obtain a first level encrypted content, and then performs a second encryption scheme on the first level encrypted content to obtain a second level encrypted content. For instance, the Enc function may perform dual encryption on the content with symmetric encryption as the first level of encryption and then a proxy-based encryption as the second level of encryption. The dual encryption scheme may enable the data protection scheme 200 to protect content confidentiality and to outsource flexible access control policies.

To delegate different access control mechanisms, the content provider 232 may distribute corresponding re-encryption keys rk to the application service in the cloud 212. The application service may transform the ciphertext (encrypted content) in the cloud 212 by calling a re-encryption (Re_Enc) function with rk so that subscribers (the consumers 234) may decrypt the content with a shared secret key uk (between the content provider 232 and the consumers 234). When a change or an update incident occurs in the user group (the consumers 234), e.g., when a user joins or leaves the group, the content provider 232 may update the content re-encryption key rk that may be stored in the application service to invalidate any previous version of the encrypted content.

To update the content re-encryption key, the content provider 232 may implement a re-encryption key (Re_Key) function that generates a new delegation key for the application service. Hence, the application service may produce a new ciphertext for the content by implementing Re_Enc on the original cipher content in the cloud 212 with the new re-encryption key rk. A relatively small part of the resulting new cipher content may be stored in the cloud storage service and the main part (e.g., a remaining part) of the cipher content may be cached in the delivery network (the CON/CDN 222) to accelerate content distribution. During the re-encryption process, a relatively small part of the ciphertext of the content may require updating. The main part of the content may remain unchanged and may be kept cached within the delivery network. When accessing a content object, a client (a consumer 234) may have to obtain all parts of the content from the cloud 212 and the distribution network (the CON/CDN 222) in order to decrypt and render the content. This feature may achieve at least some of the security objectives above and efficient content distribution.

The data protection scheme may apply a dual encryption scheme to protect content confidentiality and may also bridge a proxy-based re-encryption scheme and a secret sharing scheme. A proxy-based re-encryption scheme may be used as described by Giuseppe Ateniese et al. and entitled "Improved Proxy Re-encryption Schemes with Applications to Secure Distributed Storage", in the Association for Computing Machinery (ACM) Transactions on Information and System Security, 9:1-30, February 2006, which is incorporated herein by reference. A secret sharing scheme may also be used as described by M. Naor et al. and entitled "Efficient Trace and Revoke Schemes", in Proceedings of the 4th International Conference on Financial Cryptography, 2001, which is incorporated herein by reference. Table 1 shows the notations used in the description of the operations and algorithms below. More details about the operations and algorithms may be described by Huijun Xiong et al. and entitled "Towards End-to-End Secure Content Storage and Delivery with Public Cloud", in ACM Conference on Data and Application Security and Privacy (CODASPY) 2012, which is incorporated herein by reference as if reproduced in its entirety.

TABLE 1

| Term | Notation | Term | Notation |
| --- | --- | --- | --- |
| PK | content provider's public key | P | polynomial formula |
| SK | content provider's secret key | $x_i$ | user i's value |
| uk | shared secret key for a group | $P(x_i)$ | polynomial value of |

TABLE 1-continued

| Term | Notation | Term | Notation |
|------|----------|------|----------|
| $rk_{SK \to uk}$ | re-encryption key | M | user i original content |

The data protection scheme above may comprise a system setup state or operation, which may be implemented by the content provider to prepare the cryptographic system for content encryption and re-encryption. The content provider 232 may first choose a plurality of system public parameters (params), which may include $g \in G$ and a bilinear map. The parameter G is a multiplicative cyclic group as described by Huijun Xiong et al., and g is a value selected from G. The bilinear map may be used as described by D. Boneh et al. in "Identity-based Encryption from the Weil Pairing", in the International Association for Cryptologic Research conference CRYPTO 2001, and by D. Boneh et al. in "Short Signatures from the Weil Pairing", in the Advances in Cryptology Proceedings of conference ASIACRYPT 2001, both of which are incorporated herein by reference. The content provider may also choose a proxy secret key $SK \in Z_r$ and a public key $PK = g^{SK} \in G$, where $Z_r$ is a set of values of order r as described by Huijun Xiong et al. The content provider may keep SK secret and may choose an integer k and a list L of polynomials of degree k-1 with coefficients randomly chosen from $Z_r$, which may be kept secret. The number of users or consumers who may be revoked at about the same time may be k-1. The content provider may then choose a random number from $Z_r$ as the initial group secret key uk. The system setup operation may be performed by the content provider for each group of users.

The data protection scheme may comprise a content publishing state or operation, which may be implemented by the content provider to publish content to the (public) cloud. The content provider may perform a dual encryption scheme as follows, where the content provider may encrypt the content M with a symmetric data encryption key (DEK) to produce a ciphertext C(M,DEK). The content provider may then further encrypt the content C(M,DEK) with the secret key (SK) and the params, as shown in Algorithm 1 in Table 2 below. The resulting encrypted content may have about three components ($u_{SK}$, w, v), which may be stored in the cloud-based storage service by the application service via cloud APIs. The component $u_{SK}$ may depend on a random secret h and the content provider's secret key SK, The first content component w may depend on the random secret h and the data encryption key DEK. The second content component v may depend on both h and the original content. Typically, $u_{SK}$ and w may be substantially smaller in data size than v.

TABLE 2

Algorithm 1: Enc(params, M, SK, DEK)

1: Content provider chooses a random secret $h \in Z_r$;
2: Content provider chooses symmetric data encryption key DEK and encrypts the content M to obtain ciphertext C(M, DEK);
3: Let Z denote $\hat{e}(g, g)$: Compute $u_{SK} = g^{SK \cdot h}$ and $Z^h = \hat{e}(g, g^h) = \hat{e}(g, g)^h \in G_T$;
4: Content provider outputs ciphertext of content M:
$(u_{SK}, w, v) = (g^{SK \cdot h}, DEK - Z^h, C(M, DEK) - Z^h)$.

The data protection scheme 200 may comprise a content retrieving state or operation, which may be implemented when the subscribers or consumers may access content that may be stored in the cloud. This operation may comprise the Re_Key and Re_Enc functions or algorithms. Using the Re_Key algorithm, the content provider may generate a content re-encryption key $rk_{SK \to uk}$ with the content provider's secret key SK and the current decryption key uk. Details of the Re_Key algorithm are shown in Algorithm 2 in Table 3 below.

TABLE 3

Algorithm 2: Re_Key(params, SK, uk)

1: Given params, SK and uk, the content provider computes $rk_{SK \to uk} = g^{uk/SK}$.

Upon request, the application service may obtain the newest $rk_{SK \to uk}$ from the content provider and re-encrypt the target cipher content ($u_{SK}$, w, v) with the Re_Enc algorithm. Details of the Re_Enc algorithm are shown in Algorithm 3 in Table 4 below.

TABLE 4

Algorithm 3: Re_Enc(($u_{SK}$, w, v), $rk_{SK \to uk}$, params)

1: The proxy calculates $u_{uk} = \hat{e}(rk_{SK \to uk}, u_{SK}) = \hat{e}(g^{uk/SK}, g^{SK \cdot h}) = \hat{e}(g, g)^{uk \cdot h} = Z^{uk \cdot h}$;
2: The proxy outputs re-encrypted content ($u_{uk}$, w, v).

The re-encryption may be performed on $u_{SK}$ without the other components of the published content. Since $u_{SK}$ may be independent of the content M, the scheme may save the processing time and storage input/output (I/O) cost of the application service and the storage service.

After this, the application service may store the cipher content ($u_{uk}$, w, v) in the cloud storage service and allow the download. For each cipher content, w and v may be cached in the content delivery network, while $u_{uk}$ may not be cached. Since the size of $u_{uk}$ is relatively small to the remaining content components, this operation may not affect the efficiency of content delivery. When the system state is changed, e.g., a user joins or leaves or is revoked from the group, the shared secret key may be updated from uk to uk'. When the new secret key is updated to authorized users, the content provider may generate the re-encryption key (re-key) $rk_{SK \to uk}$ by implementing the Re_Key algorithm and send the re-key to the application service for content re-encryption with the Re_Enc algorithm. The new cipher content is referred to as ($u_{uk'}$, w, v). The user may then download $u_{uk'}$ from the cloud storage, and w and v from the content delivery network.

After the user obtains the encrypted content ($u_{uk'}$, w, v), the user may implement Algorithm 4 in Table 5 below to decrypt the cipher with the user's current secret key uk. The user may either obtain the secret key uk from the content provider when the user first joins or may compute the secret key.

TABLE 5

Algorithm 4: Decrypt(($u_{uk}$, w, v), uk)

1: Given $u_{uk} = (Z^{uk \cdot h})$ and uk, the subscriber computes $u_{uk}^{1/uk} = Z^h$;
2: The subscriber calculates $DEK = w/Z^h$, and $C(DEK, M) = v/Z^h$;
3: The subscriber decrypts C(DEK, M) with DEK;
4: The subscriber outputs original content M.

As described above, the data protection scheme may integrate symmetric encryption and proxy-based re-encryption, e.g., in a seamless manner to the content providers/consumers. The algorithms above may allow caching a substantial portion of a stored cipher content object in the delivery network for content distribution (e.g., the CON/CDN), while keeping a smaller or minor part in the cloud storage for key management. The confidentiality-oriented proxy-based re-encryption policies may enable flexible and scalable deployment and provide improved or stronger security for cached content in the network.

Figure 3:
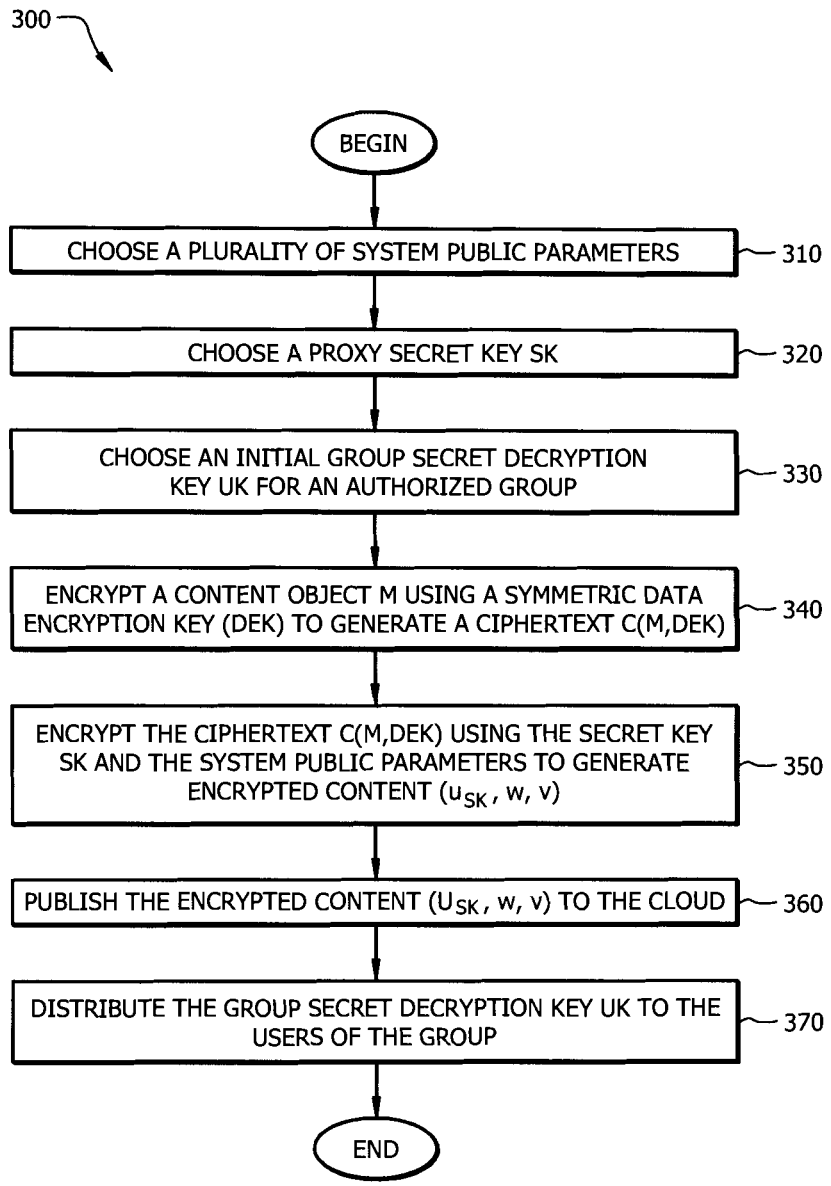
FIG. 3 is a flowchart of an embodiment of a secure content publishing method.

FIG. 3 illustrates an embodiment of a secure content publishing method 300 that may support or implement the data protection scheme above. The secure content publishing method 300 may be implemented by a content provider, e.g., using hardware, software, or both. The content provider may communicate or interact with other components, such as the cloud service, the content delivery service (the CON/CDN), and one or more content users or subscribers, e.g., in one or more groups. The method 300 may begin at block 310, where the content provider may choose a plurality of system public parameters, as described in the system setup state above. At block 320, the content provider may choose a proxy secret key SK. At bock 330, the content provider may choose an initial group secret decryption key uk for an authorized user group. At block 340, the content provider may encrypt a content object M using a symmetric data encryption key (DEK) to generate a ciphertext C(M,DEK). At block 350, the content provider may Encrypt the ciphertext C(M,DEK) using the secret key SK and the system public parameters to generate encrypted content ($u_{SK}$, w, v). At block 360, the content provider may publish the encrypted content ($u_{SK}$, w, v) to the cloud, e.g., a public cloud. The cloud may store the published encrypted content, e.g., in a cloud storage service. At block 370, the content provider may distribute the group secret decryption key uk to the users of the user group. The method 300 may then end.

Figure 4:
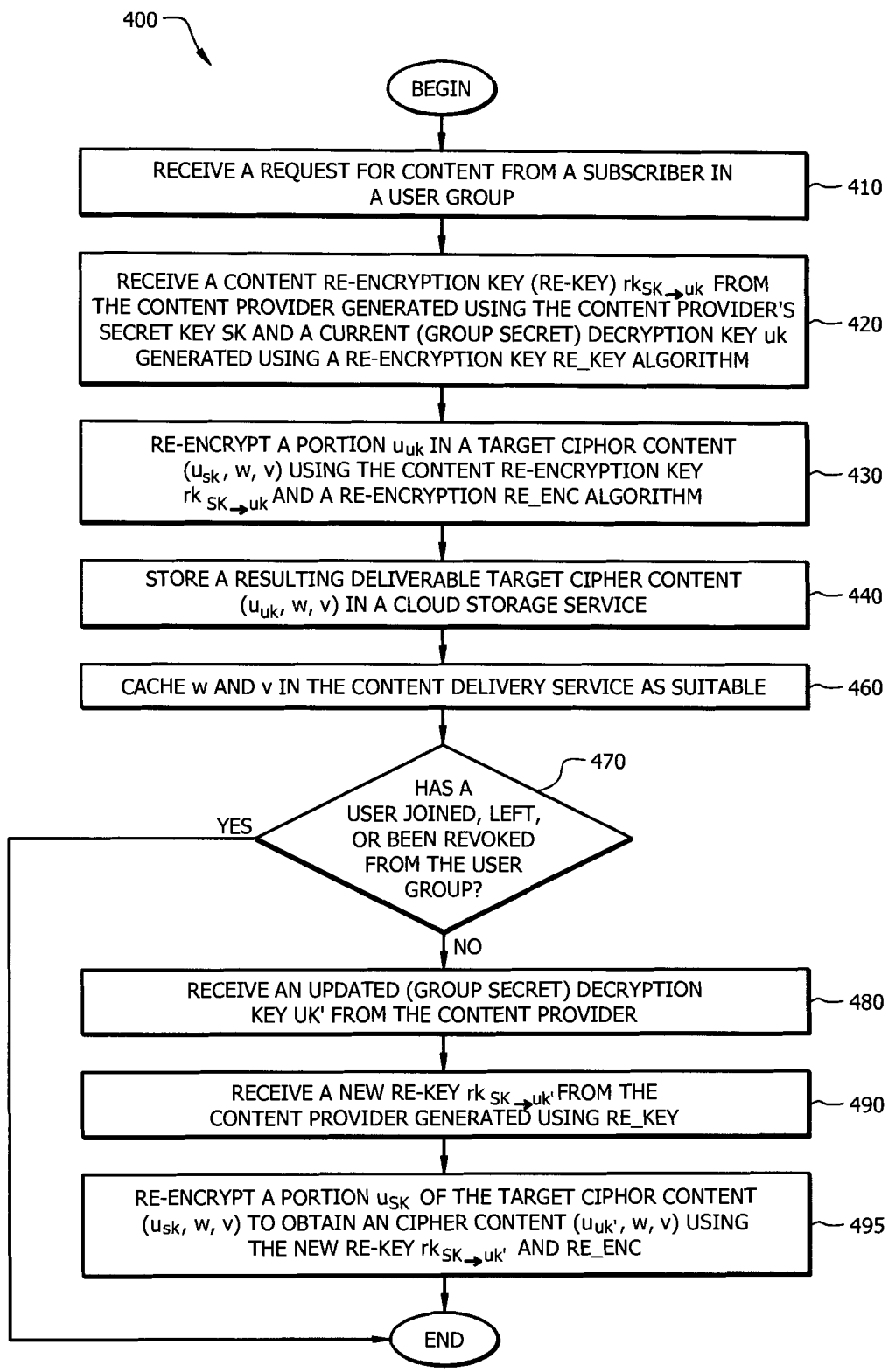
FIG. 4 is a flowchart of an embodiment of a secure content retrieving method.

FIG. 4 illustrates an embodiment of a secure content retrieving method 400 that may support or implement the data protection scheme above. The secure content retrieving method 400 may be implemented by an application service that runs on a cloud infrastructure, e.g., using hardware, software, or both. The application service may communicate or interact with other components, such as a content provider, a cloud storage service, a content delivery service (a CON/CDN), and one or more content users or subscribers, e.g., in one or more groups. The method 400 may begin at block 410, where the application service may receive a request for content from a subscriber in a user group. At block 420, the application service may receive a content re-encryption key (re-key) $rk_{SK \to uk}$ from a content provider generated using the content provider's secret key SK and a current (group secret) decryption key uk generated using a re-encryption key Re_Key algorithm.

At block 430, the application service may re-encrypt a portion $u_{uk}$ in a target cipher content ($u_{SK}$, w, v) using the content re-encryption key $rk_{SK \to uk}$ and a re-encryption Re_Enc algorithm. At block 440, the application service may store a resulting deliverable target cipher content ($u_{uk}$, w, v) in a cloud storage service. For each published content, two buckets or copies may be created: one for the originally published cipher content ($u_{SK}$, w, v) from the content provider, which may not be updated once stored, and the other for the cipher content ($u_{uk}$, w, v) to be delivered to the user or subscriber, which may be updated once a user joins or leaves the user group. Although both buckets may be made publicly readable to users, the original published one may be set private permission since only the content provider and the application service may need to access this bucket. The other content bucket may be publicly readable to all authorized users in the user group. To avoid storage redundancy, only $u_{SK}$ of the cipher content may be stored (in a cloud storage service), as the other part (w, v) is the same as the public bucket. The $u_{SK}$ part may be substantially smaller, for example may be stored in EC2 to facilitate the cryptographic operations.

At block 460, the parts w and v may be cached in cloud delivery service (e.g., the CON/CDN) as suitable. The parts w and v may be cached in at least some of the content routers in the CON/CDN that may be along the data flow of the downloaded content from the cloud to the user or subscriber. The parts w and v may not be cached a second time if the parts were previously cached at the content routers. The user or subscriber may then receive the target cipher content ($u_{uk}$, w, v) and use the group secret decryption key uk to decrypt the context and obtain clear content. At block 470, the application service (or the content publisher) may determine whether a user has joined, left, or been revoked from the user group. If the condition in block 460 is true, then the method 400 may proceed to block 480. Otherwise, the method 400 may end. At block 480, the application service may receive an updated (group secret) decryption key uk' from the content provider. At block 490, the application service may receive a new re-key $rk_{SK \to uk'}$ from the content provider generated using Re_Key. At block 495, the application service may re-encrypt a portion $u_{SK}$ of the target cipher content ($u_{uk}$, w, v) to obtain an updated cipher content ($u_{SK'}$, w, v) using the new re-key $rk_{SK \to uk'}$ and Re_Enc. The method 400 may then end.

Figure 5:
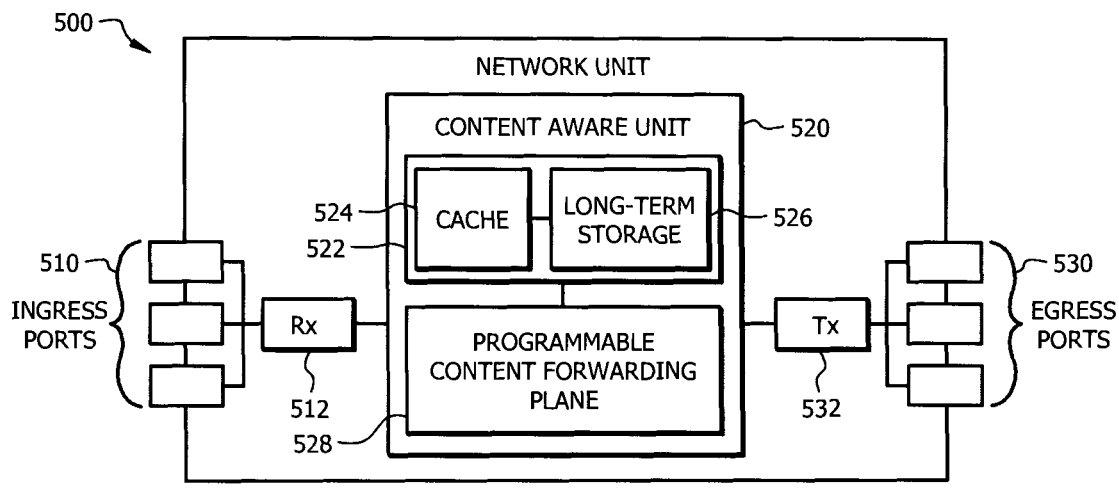
FIG. 5 is a schematic diagram of an embodiment of a network unit.

FIG. 5 illustrates an embodiment of a network unit 500, which may be any device that transports and processes data through a network. For instance, the network unit 500 may be located in the content router or any node in the CON/CDN and the cloud infrastructure. The content router may also be configured to implement or support the CON/CDN based systems and methods described above. The network unit 500 may comprise one or more ingress ports or units 510 coupled to a receiver (RX) 512 for receiving signals and frames/data from other network components. The network unit 500 may comprise a content aware unit 520 to determine which network components to send content to. The content aware unit 520 may be implemented using hardware, software, or both. The network unit 500 may also comprise one or more egress ports or units 530 coupled to a transmitter (TX) 532 for transmitting signals and frames/data to the other network components. The receiver 512, content aware unit 520, and transmitter 532 may also be configured to implement at least some of the disclosed schemes and methods, which may be based on hardware, software, or both. The components of the network unit 500 may be arranged as shown in FIG. 5.

The content aware unit 520 may also comprise a programmable content forwarding plane block 528 and one or more storage blocks 522 that may be coupled to the programmable content forwarding plane block 528. The programmable content forwarding plane block 528 may be configured to implement content forwarding and processing functions, such as at an application layer or L3, where the content may be forwarded based on content name or prefix and possibly other content related information that maps the content to network traffic. Such mapping information may be maintained in a content table at the content aware unit 520 or the network unit 500. The programmable content forwarding plane block 528 may interpret user requests for content and accordingly fetch content, e.g., based on meta-data and/or content name, from the network or other content routers and may store the content, e.g., temporarily, in the storage blocks 522. The programmable content forwarding plane block 528 may then forward the cached content to the user. The programmable content forwarding plane block 528 may be implemented using software, hardware, or both and may operate above the IP layer or L2. The storage blocks 522 may comprise a cache 524 for temporarily storing content, such as content that is requested by a subscriber. Additionally, the storage blocks 522 may comprise a long-term storage 526 for storing content relatively longer, such as content submitted by a publisher. For instance, the cache 524 and the long-term storage 526 may include Dynamic random-access memories (DRAMs), solid-state drives (SSDs), hard disks, or combinations thereof.

Figure 6:
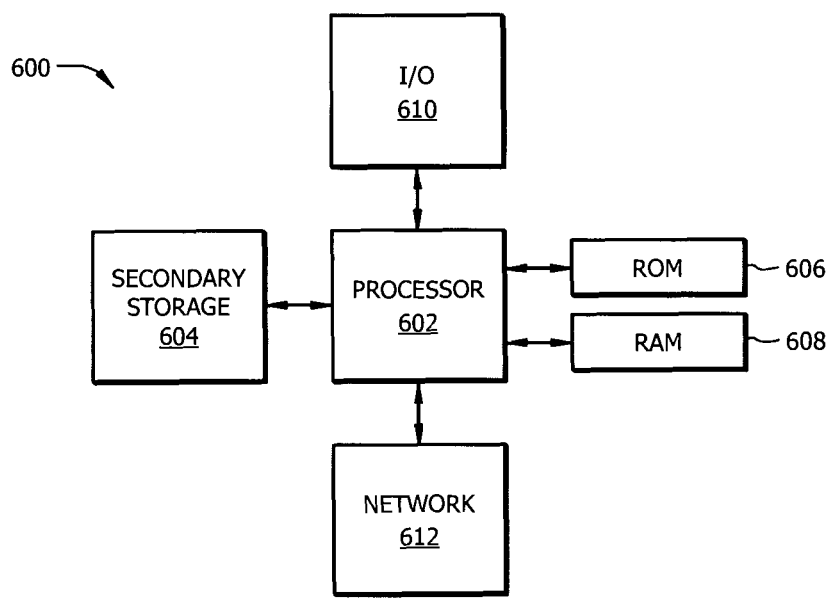
FIG. 6 is a schematic diagram of an embodiment of a general-purpose computer system.

The network components and devices described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (110) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 9 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 90 percent with a 1 percent increment, i.e., k is 1 percent, 2 percent, 3 percent, 4 percent, 8 percent, . . . , 80 percent, 81 percent, 82 percent, . . . , 97 percent, 96 percent, 97 percent, 98 percent, 99 percent, or 90 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A secure content publishing method implemented by a content provider coupled to a cloud service, comprising:
    encrypting a content object using a data encryption key to obtain an encrypted content object;
    re-encrypting the encrypted content object using a secret key to obtain a dual-encrypted content object;
    publishing the dual-encrypted content object to the cloud service to obtain a published content object;
    distributing a group decryption key for decrypting the published content object to a plurality of users in a group via a content delivery network (CDN);
    distributing an updated group decryption key for the users in the group when a user joins, leaves, or is revoked from the group; and
    forwarding an updated re-encryption key to the cloud service for re-encrypting the published content object,
    wherein the published content object is stored in the cloud service and comprises a first component that depends on a random secret and a secret key, a second component that depends on the random secret and a data encryption key, and a third component that depends on the random secret and the content object, and
    wherein the first component and the second component is smaller in data size than the third component.

2. The secure content publishing method of claim 1, further comprising forwarding a re-encryption key from the content provider to the cloud service when a user in the group requests to access the published content object.

3. The secure content publishing method of claim 2, wherein the re-encryption key is generated according to a re-encryption algorithm using the secret key and a group decryption key.

4. The secure content publishing method of claim 3, wherein the cloud service re-encrypts the published content object before allowing the user access according to the re-encryption algorithm using the re-encryption key from the content provider to obtain a deliverable copy of the content object to the user that is different from the published content object stored in the cloud service.

5. The secure content publishing method of claim 3, wherein the deliverable copy of the content object comprises a first component that is generated using the re-encryption key, a second component w that is similar to the second component of the published content object stored in the cloud service, and a third component v that is similar to the third component of the published content object stored in the cloud service.

6. The secure content publishing method of claim 5, wherein the published content object is stored in the cloud service without being subsequently updated, and wherein the deliverable copy of the content object is updated when a user joins, leaves, or is revoked from the group.

7. The secure content publishing method of claim 6, wherein the second component and the third component of the deliverable copy of the content object are cached without the first component in a content oriented network (CON) that delivers a copy of the content object.

8. The secure content publishing method of claim 4, wherein the users in the group use the group decryption key to decrypt the deliverable copy of the content object from the cloud service.

9. A computer program product comprising computer executable instructions stored on a non-transitory medium that when executed by a processor in a Central Processing Unit (CPU) cause the processor to:
encrypt a content object using a data encryption key to obtain an encrypted content object;
re-encrypt the encrypted content object using a secret key to obtain a dual-encrypted content object;
publish the dual-encrypted content object to the cloud service to obtain a published content object;
distribute a group decryption key for decrypting the published content object to a plurality of users in a group via a content delivery network (CDN);
distribute an updated group decryption key for the users in the group when a user joins, when a user leaves, and when a user is revoked from the group; and
forward an updated re-encryption key to the cloud service for re-encrypting the published content object,
wherein the published content object is stored in the cloud service and comprises a first component that depends on a random secret and a secret key, a second component that depends on the random secret and a data encryption key, and a third component that depends on the random secret and the content object, and
wherein the first component and the second component is smaller in data size than the third component.

10. The computer program product of claim 9, wherein the data encryption key is a data encryption key for a symmetric data encryption scheme.

11. The computer program product of claim 10, wherein encrypting the content object comprises using a symmetric encryption process.

12. The computer program product of claim 11, wherein re-encrypting the encrypted content object comprises using a proxy-based re-encryption process.

13. An apparatus for protecting content in a network comprising:
a memory;
a transmitter;
a processor in a Central Processing Unit (CPU) coupled to the transmitter and the memory, wherein the memory contains instructions that when executed by the processor cause the apparatus to:
encrypt a content object using a data encryption key to obtain an encrypted content object;
re-encrypt the encrypted content object using a secret key to obtain a dual-encrypted content object;
publish the dual-encrypted content object to a cloud service to obtain a published content object;
distribute a group decryption key for decrypting the published content object to a plurality of users in a group via a content delivery network (CDN);
distribute an updated group decryption key for the users in the group when a user joins the group, when a user leaves the group, and when a user is revoked from the group; and
forward an updated re-encryption key to the cloud service for re-encrypting the published content object,
wherein the published content object is stored in the cloud service and comprises a first component that depends on a random secret and a secret key, a second component that depends on the random secret and a data encryption key, and a third component that depends on the random secret and the content object, and
wherein the first component and the second component is smaller in data size than the third component.

14. The apparatus of claim 13, wherein the instructions further cause the processor to forward a re-encryption key from the apparatus to the cloud service when a user in the group requests to access the published content object.

15. The apparatus of claim 14, wherein the re-encryption key is generated according to a proxy-based re-encryption algorithm using the secret key and the group decryption key, wherein the cloud service re-encrypts the published content object before allowing the user access according to the re-encryption algorithm using the re-encryption key from the content provider to obtain a deliverable copy of the content object to the user that is different from the published content object stored in the cloud service, wherein the deliverable copy of the content object comprises a first component that is generated using the re-encryption key, a second component w that is similar to the second component of the published content object stored in the cloud service, and a third component v that is similar to the third component of the published content object stored in the cloud service, wherein the published content object is stored in the cloud service without being subsequently updated, and wherein the deliverable copy of the content object is updated when a user joins, leaves, or is revoked from the group, and wherein the second component and the third component of the deliverable copy of the content object are cached without the first component in a content oriented network (CON) that delivers a copy of the content object.

* * * * *